United States Patent
Nair et al.

(10) Patent No.: US 10,079,721 B2
(45) Date of Patent: Sep. 18, 2018

(54) INTEGRATED DIGITAL NETWORK MANAGEMENT PLATFORM

(71) Applicant: Netsights360, Overland Park, KS (US)

(72) Inventors: Jithesh Kizhakkekkara Nair, Lenexa, KS (US); Sunil Ponnangath Nair, Overland Park, KS (US); Navin Babu Irimpan, Overland Park, KS (US); Krishnakumar Nair, Overland Park, KS (US)

(73) Assignee: Netsights360, Overland Park, KS (US)

( * ) Notice: Subject to any disclaimer, the term of this patent is extended or adjusted under 35 U.S.C. 154(b) by 162 days.

(21) Appl. No.: 15/136,228

(22) Filed: Apr. 22, 2016

(65) Prior Publication Data

US 2017/0310546 A1    Oct. 26, 2017

Related U.S. Application Data

(63) Continuation of application No. 15/136,135, filed on Apr. 22, 2016.

(51) Int. Cl.
*H04L 12/26* (2006.01)
*H04L 12/24* (2006.01)
*H04M 3/22* (2006.01)
*H04W 24/02* (2009.01)

(52) U.S. Cl.
CPC ...... *H04L 41/0823* (2013.01); *H04L 41/0816* (2013.01); *H04L 41/0863* (2013.01); *H04L 41/0886* (2013.01); *H04M 3/2227* (2013.01); *H04W 24/02* (2013.01)

(58) Field of Classification Search
CPC ............. H04L 41/0816; H04L 41/0823; H04L 41/0863; H04L 41/0886; H04M 3/2227
See application file for complete search history.

(56) References Cited

U.S. PATENT DOCUMENTS

| | | | |
|---|---|---|---|
| 6,473,871 B1 * | 10/2002 | Coyle | G06F 11/221 714/715 |
| 9,763,114 B2 * | 9/2017 | Bowdery | H04W 24/02 |
| 2002/0177910 A1 * | 11/2002 | Quarterman | H04L 43/50 700/28 |
| 2013/0143561 A1 * | 6/2013 | Nuss | H04W 24/02 455/436 |

(Continued)

*Primary Examiner* — Kevin Mew
(74) *Attorney, Agent, or Firm* — Erise IP, P.A.

(57) ABSTRACT

A digital network assistant which can detect network anomalies, identify actions likely to remediate them, and assist the user in carrying out those actions. In particular, a digital network assistant constantly monitors data streams associated with the network to determine key performance indicators for the network. When these key performance indicators indicate a network anomaly, the digital network assistant associates it with a digital string to one or more actions likely to remediate similar network issues. The digital network assistant can take these actions automatically or present them to a user to be taken. The system can also aid the user in taking the required actions via an augmented reality interface. In addition, the system can create narratives embedding findings from data analysis eliminating subjectivity. The system can also find optimal parameter sets by continuously analyzing anomaly-free parts of the network and their key performance indicators.

20 Claims, 6 Drawing Sheets

(56) References Cited

U.S. PATENT DOCUMENTS

| | | | | |
|---|---|---|---|---|
| 2013/0290399 | A1* | 10/2013 | Gordon | H04L 67/1097 709/201 |
| 2014/0247750 | A1* | 9/2014 | Tapia | H04L 41/0816 370/254 |
| 2015/0087325 | A1* | 3/2015 | Nuss | H04W 28/08 455/453 |
| 2015/0199224 | A1* | 7/2015 | Mihnev | H04L 43/045 714/37 |
| 2016/0157252 | A1* | 6/2016 | Lu | H04W 8/24 370/329 |
| 2016/0212758 | A1* | 7/2016 | Leung | G06Q 10/00 |
| 2016/0316485 | A1* | 10/2016 | Kumar | H04W 24/08 |
| 2016/0366027 | A1* | 12/2016 | Tang | H04W 24/02 |
| 2017/0039554 | A1* | 2/2017 | Greifeneder | G06Q 20/389 |
| 2017/0208486 | A1* | 7/2017 | Peterson | H04W 24/02 |
| 2017/0230846 | A1* | 8/2017 | Wang | H04W 24/04 |
| 2017/0272319 | A1* | 9/2017 | Sheen | H04W 24/10 |
| 2017/0272960 | A1* | 9/2017 | Li | H04L 41/0816 |
| 2017/0310542 | A1* | 10/2017 | Nair | H04L 41/082 |
| 2017/0317873 | A1* | 11/2017 | Hevizi | H04L 41/0681 |

\* cited by examiner

INTEGRATED DIGITAL NETWORK MANAGEMENT PLATFORM

RELATED APPLICATION

This application is a continuation patent application and claims priority benefit, with regard to all common subject matter, of earlier-filed U.S. patent application Ser. No. 15/136,135, filed Apr. 22, 2016, and entitled "INTEGRATED DIGITAL NETWORK MANAGEMENT PLATFORM" The above-identified application is hereby incorporated by reference into the present application in its entirety.

BACKGROUND

1. Field

Embodiments of the invention generally relate to the management of complex networks (such as telecommunications networks, Internet Protocol (IP) networks, Internet/Industrial Internet of Things (IoT/IIoT), and cable networks), and more particularly to the identification and remediation of network anomalies in such networks.

2. Related Art

Traditionally, identifying and remediating outages and other performance anomalies in complex networks has relied on individual engineers having complete knowledge of the network and the interactions between all of the network elements that make it up. However, as network scale increases and the number of engineers increases with it, it becomes impractical for an individual engineer to diagnose a network fault that may ultimately be due to a variety of possible reasons such as misconfiguration or equipment failure across the country. Accordingly, there is a need for an expert self learning system for tracking network anomalies, analyzing multiple network log data streams and deriving recommended actions which are likely to resolve them and optimize network performance, and for applying this knowledge to new network anomalies.

SUMMARY

Embodiments of the invention address the above-described need by providing for a digital network assistant which can detect network anomalies, identify actions likely to remediate them, and assist the user in carrying out those actions. In particular, in a first embodiment, the invention includes a method of automatically identifying and remediating faults in a network, comprising the steps of ingesting a plurality of data streams from a respective plurality of telecommunications network elements, analyzing the data streams to determine a key performance indicator, identifying an anomaly in the key performance indicator, identifying a digital string associated with the anomaly and including a plurality of actions likely to remediate the anomaly, for each action of the plurality of actions, determining if the action can be performed automatically, calculating a confidence score for the action, if the calculated confidence score is above a predetermined threshold and the action can be can be performed automatically, automatically performing the action, and otherwise, adding the action to an action sheet for the anomaly, determining an effective action for the anomaly, wherein the effective action remediates the anomaly, and storing the effective action as an action likely to resolve the anomaly.

In a second embodiment, the invention includes a system for managing a network, comprising an augmented reality interface and one or more computer readable media storing computer-executable instructions that, when executed by a processor, perform a method of identifying and remediating faults in a network, comprising the steps of ingesting a plurality of data streams from a respective plurality of network elements, analyzing the data streams to determine a key performance indicator, identifying an anomaly in the key performance indicator, identifying a digital string associated with the anomaly and including a plurality of actions likely to remediate the anomaly, for each action of the plurality of actions, determining if the action can be performed automatically, if the action can be performed automatically, performing the action, if the action cannot be performed automatically, adding the action to an action sheet for the anomaly, presenting, to a user, and via the augmented reality interface, the action sheet, automatically presenting, to the user and via the augmented reality interface, a visualization relevant to a network element associated with an action item on the action sheet, wherein the augmented reality interface is programmed to allow the user to issue a gestural command to effect a physical change on the network element, and automatically tracking completion of the action item as the user interacts with the network element.

In a third embodiment, the invention includes a digital network assistant, programmed to determine, for a user, an action sheet associated with managing a network, present, to the user and via an augmented reality interface, the action sheet, automatically present, to the user and via the augmented reality interface, visualizations relevant to a network element associated with an action item on the action sheet, wherein the augmented reality interface is programmed to allow the user to issue a gestural command to effect a physical change on the network element, and automatically track completion of the action item as the user interacts with the network element.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide a digital network assistant to constantly monitor data streams associated with the network and determine key performance indicators for the network. These data streams may come from the network elements making up the network, project and or deployment schedules, special event schedules, capacity events, radio frequency (RF) drive test data, mobile device and application data, from a trouble-ticketing system, or even from mentions of the network on social media. These key performance indicators are tracked over time to determine when network anomalies occur.

When a network anomaly does occur, the digital network assistant associates it with a digital string which associates correlated data streams via a chain of intermediate causes to a root cause and from there to one or more actions that have been historically likely to remediate similar network issues. These actions can be taken automatically or presented on an action sheet (i.e., an ordered list of action items to be completed) to a user, depending on their likelihood of remediating the anomaly. When an action is taken that does remediate the anomaly, it is stored with the digital string to reinforce that action and increase the future confidence for that action. These digital strings are stored in a library of digital strings which can be utilized by the system to predict future recommended actions, to generate reports, and/or to replace existing trouble ticketing systems.

The digital network assistant can also assist the user in taking required actions by presenting an augmented reality interface allowing physical manipulation of virtual elements to control software functions of the network element the user is viewing in real space, and by presenting an overlaid representation of any associated key performance indicators and actions the user must take in manipulating the physical network element.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environment for Embodiments of the Invention

Figure 1:
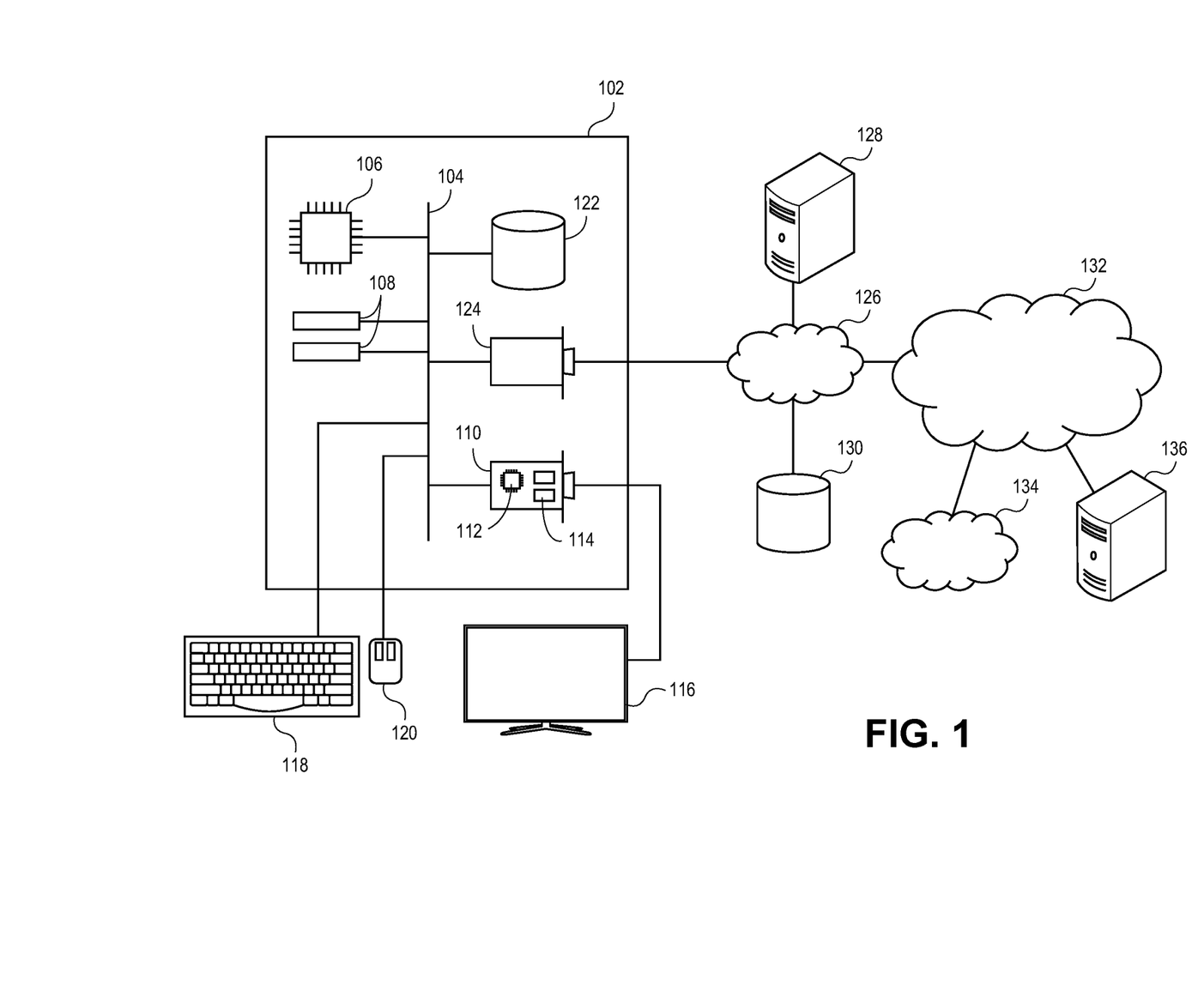
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. As discussed below, display 116 may be a monitor, a heads-up display, or other augmented reality interface. Similarly, peripherals such as keyboard 118 and mouse 120 are connected to system bus 104. Like display 116, these peripherals may be integrated into computer 102 or absent, or may be replace by voice, gaze, or gestural controls. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132. In other embodiments, local network 126 and/or Internet 132 may include the function of one or more public, private, or hybrid cloud computing clusters.

Embodiments of the Invention in Operation

Figure 2:
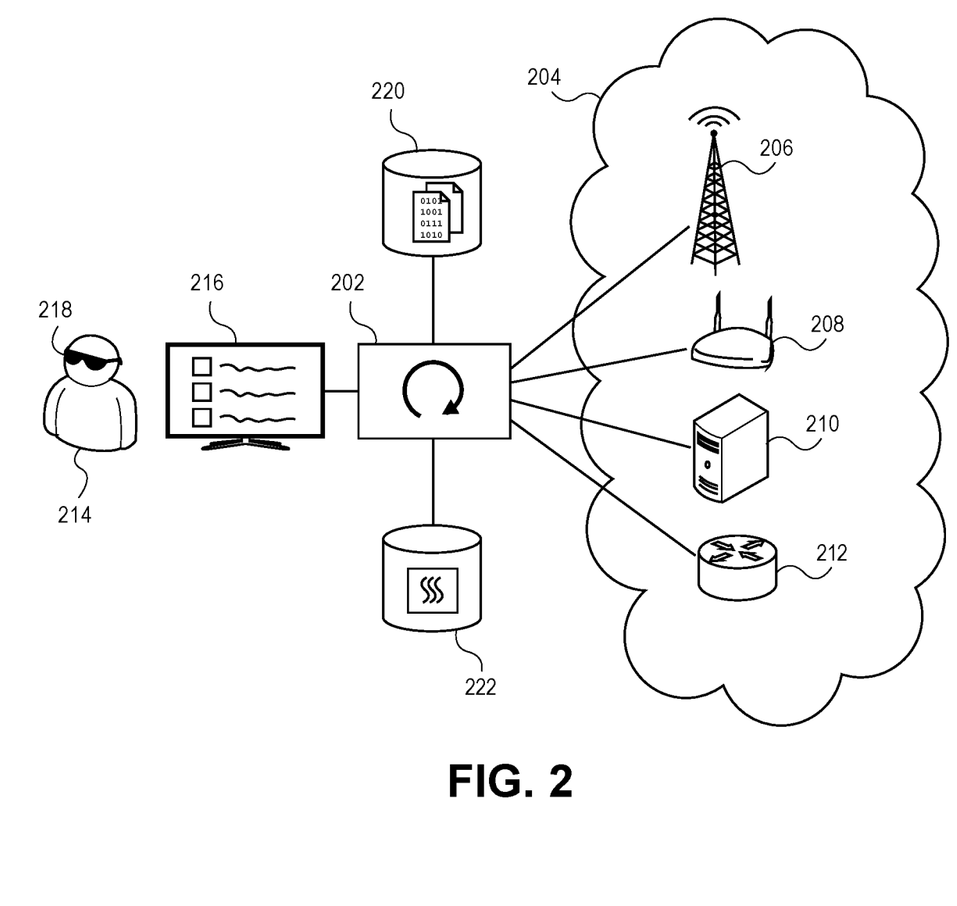
FIG. 2 depicts a system architecture diagram depicting certain components used with embodiments of the inventions.

Turning now to FIG. 2, a system architecture diagram depicting certain components used with embodiments of the inventions is depicted. Digital network assistant 202 is an expert system broadly useful for managing complex networks such as telecommunications network 204. Often, faults in such networks can be detected, but remain challenging to diagnose. For example, an observed drop in data throughput in a particular region in a cellular network could actually be ultimately attributable to a regression in the software used to control an eNodeB in an entirely different region. The cascading chain of faults resulting in the observable fault can be complex and time-consuming to trace.

These networks are generally composed of many different network elements from many different vendors. As depicted, telecommunications network 204 includes microwave link 206, eNodeB 208, back office server 210, and IP router 212. These components are included only as examples, and in practice, complex networks will include many more types of network element, including remote radio heads, MMEs, S/PGWs, media gateways, cell site routers, IP aggregator routers, IMS platforms, Internet-of-Things (IoT) hubs and others. Different types of network (e.g., cellular networks, cable networks, or SCADA networks) will include overlapping but distinct types of network elements. For example, instead of microwave link 206 and eNodeB 208, cable networks may include QAM encoders and head-end units. One of skill in the art will appreciate that the invention is broadly applicable to many types of complex networks. In addition to different types of equipment, complex networks may include multiple vendors for the same types of equipment, for redundancy or procurement reasons. Each of these different models of equipment is likely to generate and communicate logging, telemetry, and alarm data differently.

It is one function of digital network assistant 202 to function in a central orchestration role for the network. That is, digital network assistant 202 can receive data from all network elements, and then serve as a central repository for any reporting system (or other data-consuming application) that needs access to the data. In this way, each source of data only needs to communicate with a single data sink, and each sink for data only needs to retrieve data from a single source. Digital network assistant 202, in its role as central orchestrator, can also control the remotely operable functions of the various network elements, as well as manage their configurations, as discussed below. Thus, by tightly integrating with all of the components of the network, digital network assistant 202 can centralize network management and analytics and increase the efficiency of network engineers.

It is another function of digital network assistant 202 to ingest and analyze the various data streams from the network elements making up the network. By analyzing these data streams in real time, visualizations of key performance indicators for the network can be generated and presented to user 214. These visualizations can be presented on display 216 or via augmented reality interface 218. Generation and display of visualizations is discussed in greater detail below. In addition to generating and displaying visualizations of key performance indicators, data can also be analyzed to detect anomalies in the data streams. For example, sudden and severe degradation of a key performance indicator may indicate that a network element has failed and that action must be taken to restore system performance. Analyzing ingested data to detect anomalies is also discussed in greater detail below.

It is yet another function of digital network assistant 202 to track detected anomalies and how they are resolved. In order to do this, digital network assistant 202 uses "digital strings." As used wherein, a digital string includes a plurality of digital segments, and each digital segment is a correlation of data streams (as described in more detail below) across a given domain (e.g., the time domain). By tracing the chain of correlations back, the root cause of the anomaly (and therefore, the actions which can be used to remediate the anomaly) can be determined. Digital strings are stored in digital string data store 222 for resolving future instances of the anomaly or similar anomalies. For example, the throughput drop described above might be resolved by reverting the firmware for the mount for the microwave link transmitter. The anomaly, the solution, and any other relevant logging data can be stored as a digital string. Then, if a similar drop in throughput is observed with similar logging data in the future, digital network assistant 202 can suggest "revert eNodeB firmware" as a potential action to resolve the anomaly to user 214.

In some embodiments, it is yet another function of digital network assistant to control logging of the various data streams in data store 220. For example, reporting data may be ingested and stored in its entirety in data store 220. By contrast, only specific subsets of analytics data may be stored in data store 220. For example, increased storage of raw data streams may be triggered when an anomaly is detected, to aid in identifying similar anomalies in the future. In some embodiments, real-time data analytics may be used to preprocess data such that only summary data is stored in data store 220. In some such embodiments, the data stored may be determined dynamically, based on network condition, key performance indicators, or other criteria.

Digital Strings

Figure 3:
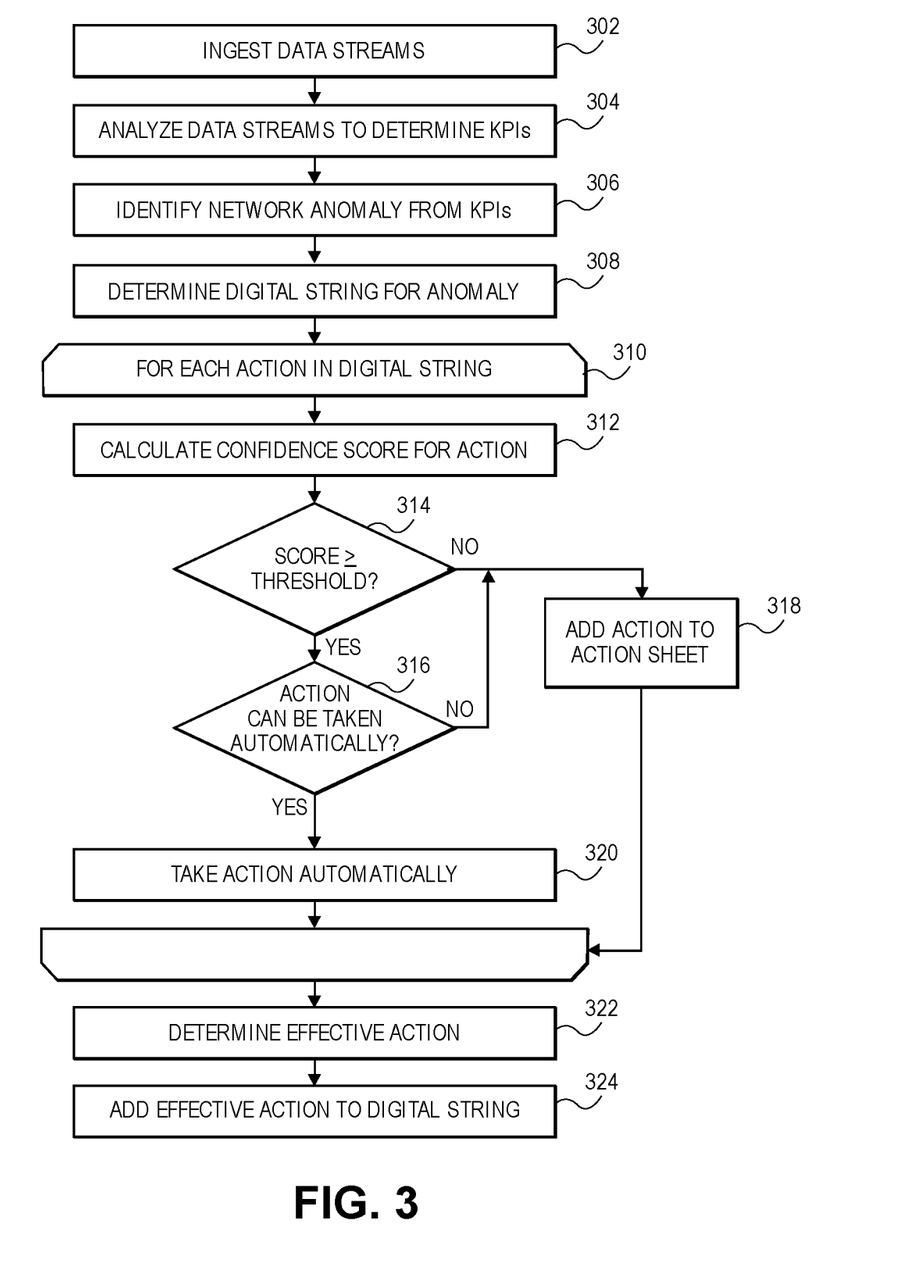
FIG. 3 depicts a flowchart illustrating the operation of a method in accordance with embodiments of the invention.

Turning now to FIG. 3, a flowchart illustrating the operation of a method in accordance with embodiments of the invention is depicted. Initially, at step 302, data streams corresponding to one or more network elements are ingested by the system. Digital network assistant 202 can obtain data streams from network elements in a variety of ways. For example, some network elements may generate and store logs in real time to a networked data store accessible to digital network assistant 202. Other network elements may offer live logging over a network connection such as a virtualized serial console. Still other network elements may store log files locally that can be retrieved over the network when they are needed, or provide push notifications of aberrant conditions. In other cases network data streams are consolidated at a centralized, intermediary system (such as an Operations Support System (OSS)), to which the digital network assistant has access to read the consolidated data streams.

Different types of network element may also provide different types of data streams. For example, some network elements may generate plain text log files, with one log entry per line. Other network elements may store log entries to a database for easy search and retrieval. Still other network elements may send notifications of alarms via email, SMS/MMS messages or paging messages. As part of step 302 of ingesting the data, the various data streams can be parsed and converted to a standard representation for convenient manipulation and storage if needed.

In some embodiments, other data streams from non-network element sources are also ingested. For example, project management schedules, change tracking logs, and parameter configuration logs may also be ingested by the system to monitor deployment activity. Similarly, advance knowledge of special events that will impact the network may be included in a data stream. For example, large sporting events may cause congestion at nearby cell sites, and significant pay-per-view events may impact capacity of cable networks. Data streams of counter data may be ingested to track network capacity, parameter change logs and drive test logs may be included to track network optimization efforts, and data streams from deep packet inspection network elements can be ingested to track how the network is being used. One of skill in the art will appreciate that a wide variety of other data streams can be ingested and analyzed by digital network assistant 202 in addition to these.

Once the data streams have been ingested and parsed, processing can proceed to step 304, where the data from the data streams is analyzed to determine one or more key performance indicators. Broadly, key performance indicators are aggregate metrics for network performance. For example, in a cellular network, call drop rate, connection failure rate, sector throughput, and total bandwidth utilization may be key performance indicators. For SCADA networks, process outputs and state (e.g., power output and reactor temperature for a power plant) may be key performance indicators. One of skill in the art will appreciate that the key performance indicators will vary depending on the network being monitored, but embodiments of the invention can be applied regardless of the specific nature of the key performance indicators for a given network.

Based on the key performance indicators, processing can proceed to step 306, where an anomaly is identified in network performance. While some anomalies will be obvious (e.g., complete regional network outages), the digital network assistant can identify a variety of network anomalies before they become critical or user-visible. As such, there are a number of anomaly detection cases. First, the digital network assistant continuously monitors for sudden and severe anomalies. These network anomalies are characterized by a sudden degradation in one or more key performance indicators, and are typically caused by software or hardware failure of one or more network elements. Network anomalies may span any portion of the network hierarchy: a single sector carrier, a whole sector, a cell site, a cluster of cell sites, a network region or market, or the entire network. As such, in order to diagnose the fault the digital network assistant may determine the number and identity of sectors and/or sector carriers involved, as well as the time of the degradation (and any subsequent improvement) of the key performance indicator.

In particular, sudden and severe anomalies are detected via sudden changes in the amplitude, stochastic distribution and/or slope of a time series of key performance indicator data. For example, if the amplitude for a key performance indicator has shifted by 100% or more in one hour, a sudden and severe anomaly is reported, together with the degree of degradation for narrative purposes, as discussed below. Similarly, if a sudden and severe degradation is sustained over an extended period (for example, 2 days), this may also be included in the narrative. In some embodiments, sudden and severe improvements are also reported as anomalies.

Second, the digital network assistant monitors for long term (or creeping) anomalies. These anomalies are characterized by a slow increase (or decrease) in a key performance indicator over a long period of time. For example, the key performance indicator may be sampled or smoothed over a period of 2 weeks, 1 month, 3 months and/or 6 months and compared to previous values. Creeping anomalies are typically caused by changing network conditions, such as the gradual introduction of new equipment (e.g., new models of handset) or gradually changing usage patterns. As such, the digital network assistant can diagnose these faults by (for example) locating correlated changes in other data streams across multiple dimensions, such as time, network element vendor, network element type (e.g., eNodeBs, MMEs, or IP routers), software releases, or device model.

Broadly, creeping anomaly detection aims to detect and quantify longer-term trends in a key performance indicators across any level of the network hierarchy. In order to track the long-term trends in key performance indicators, a medium-term (e.g., over a two-week period) moving average of the key performance indicator is calculated. Then, if the slope changes by more than a preconfigured amount (for example, by more than 20%), a creeping anomaly is flagged. Information about when the creeping anomaly began is also reported so that it can be included in the narrative. Thus, for example, it could be reported that the "call drop rate" key performance indicator has increased by 50% over the past six months. In some embodiments, a configurable time window is used. For example, the user may be able to configure their time window for creeping anomaly detection up to 12 months.

In some embodiments, when a creeping anomaly is detected, the entire time series of the key performance indicator data is made available to show how the degradation has evolved over time, with key points (such as the start of the anomaly and other historical anomalies) highlighted. In some such embodiments, training historical data can be added when a new key performance indicator is identified, to help identify degradations where actual historical data is unavailable. In some embodiments, historical data may be adjusted to remove seasonal effects. For example, key performance indicators related to average signal strength may be typically higher in winter due to a lack of foliage. As such, these key performance indicators would be seasonally adjusted to prevent a creeping anomaly from being detected each spring when foliage returns.

Third, the digital network assistant monitors for short term variability (or spiking) anomalies. These anomalies are characterized by a consistently high number of short term spikes in key performance indicators that are too brief to take averages for the key performance indicator out of specification, but may impact user experience or indicate more severe underlying problems in the network. To identify such anomalies, the digital network assistant can maintain a count of the number of times the instantaneous values of the key performance indicators exceed a predetermined value. Alternatively, the digital network assistant can monitor the standard deviation of the key performance indicator for increases.

Fourth, the digital network assistant can monitor the network for optimization anomalies in the period following optimization changes (e.g., configuration changes throughout the network or in a subset of the network) to determine the effect of the optimization change on the key performance indicator over the period following the configuration change. For detecting optimization anomalies, the digital network assistant can monitor the key performance indicators in a one- to two-week interval around the optimization change to confirm that the optimization performed correctly and did not cause a regression in network performance. In order to monitor (and remediate) optimization anomalies, the digital network assistant may be integrated with an automated configuration management system (e.g., Puppet or Chef) that can allow it to determine when configuration changes have been made for a network element and (if necessary) automatically revert those changes.

Fifth, the digital network assistant can monitor the network to detect deployment (or no-harm) anomalies caused by changes in network elements (e.g., newly deployed or replaced network elements). Such anomalies may also be caused by temporary deployments such as the mobile cell sites used in markets hosting major sporting events. Unlike the optimization anomalies described above, deployment anomalies are highly time-sensitive. As such, data from a short period (e.g., 48 hours, 24 hours, or even less) after the deployment is compared against data from a longer period prior (e.g., one week) to the deployment. This can detect either very short-term degradations or gradual but prolonged degradations.

Once an anomaly has been detected, processing proceeds to step 308, where a digital string for the anomaly is identified. Broadly, a digital string comprises an anomaly and one or more action/actor tuples which are suggested to remediate the anomaly. Broadly, an "action" is a specific network action to be performed and an "actor" is a human or machine resource (including the digital network assistant) to perform that action. In some embodiments, a digital string may further comprise one or more "secondary symptoms" to distinguish different root causes which may manifest in the same anomalous key performance indicator. In other embodiments, each digital string includes a unique identifier. As described above, digital strings may be stored in a database and are searchable by any attribute of the digital string. Conceptually, a digital string starts at the detection of an anomaly in a key performance indicator, ends at the remediation of the anomaly, and pieces together multiple correlation segments linking intermediate causes to the root cause. Thus, by identifying correlations in data sets, causation can be established and by measuring the results of the implementation of recommended actions derived from the correlation in data sets, associated confidence scores can be established.

The action/actor tuples associated with a digital string can be established in any of a wide variety of ways. For example, empirically determined static decision trees can be included as initial training data. A decision tree canvas can also be included such that actors (e.g., engineers) can add new actions that they have found effective in resolving particular anomalies. In addition to manual entry of actions in decision trees, the digital network assistant includes a variety of machine learning algorithms for automatically creating decision trees and correlation maps based on historical or real time data sets. Table 1 presents a representative list of historical data sets that can be used for machine learning purposes to determine correlation maps. The machine learning algorithms can compute distributions, correlations, and covariances of each of these data sets. Then, when an anomaly is detected, a correlation map between these data sets in multiple dimensions (e.g., time and geographic domains, network type and band, network element type, device type and identity, and application(s) affected) can be created and used for digital string detection.

TABLE 1

Alarm data from network elements (such as eNodeBs, MMEs, S/PGWs, IMS platforms and IP routers associated with the market or cluster under consideration)
Network performance counter and key performance indicator data
Network deployment and special event schedule data
Network capacity counter and key performance indicator data
Customer sentiment data (e.g., from social media)
Application performance data (e.g., Youtube and Facebook apps)
Mobile device performance data
Network (e.g., network parameter) change log data
Parameter non-compliance data (e.g., obtained via periodic audit)
Radio Frequency (RF) drive test data
Location coordinates for call failures data
Network topology/solution architecture data
Software load versions In some embodiments, a visual representation of the digital string may be created after the various correlations between data set have been calculated for a given digital string. As described above, a digital string may comprise a plurality of digital segments, each adjoin to correlated data sets. The visual representation may then include each digital segment, which may have color or thickness corresponding to the strength of the correlation. Other aspects of the visual representation of the visual string may correspond to the overall confidence score of one or more of its associated actions (or context/actor/action tuples), as discussed below.

Once a digital string has been determined for the anomaly, processing proceeds to loop 310, where steps 312-320 are taken for each context/actor/action tuple in the determined decision string. In some embodiments, only some of these steps are taken for each action. In other embodiments, additional steps are taken for each action. In still other actions, these steps are only taken for a subset of the actions in each digital string. For example, some actions in a digital string may still be classified as under evaluation and therefore will not be taken automatically.

Initially, at step 312, a confidence score is calculated for the current action being processed. This confidence score represents the likelihood that taking the action will resolve the anomaly. In some embodiments, confidence scores may be determined on a per-context basis (where the context for an action includes, for example, a network technology such as LTE, a network band such as 2500 MHz, and a network market such as New York). One of skill in the art will appreciate that such a confidence score can be calculated in a wide variety of ways, and the specific algorithm disclosed below is purely exemplary. In some embodiments, a minimum number (for example, 10) observations of the effect of a context/actor/action tuple must be captured before a confidence score can be calculated. The confidence score may represent the probability of improvement and/or the degree of key performance indicator improvement (or degradation) as measured from the results of implementing a context/actor/action tuple in the network.

First, a baseline score can be established for the action based on the historical change in the associated key performance indicator associated with the action. For example, the score can be incremented by 1 for each 1% in the key performance indicator improvement for a specific context/actor/action tuple until 15% improvement after which the score can be incremented by 2 for each additional percentage of key performance indicator improvement, or decremented by 1 for each 1% in the key performance indicator degradation until 15% degradation after which the score can be decremented by 2 for each additional percentage of key performance indicator degradation. If the action is inapplicable (for example, "revert recent configuration changes" where there are no recent configuration changes), then a baseline score of 0 (or the lowest possible value) can be assigned.

Then, the confidence score can be normalized relative to other actions in the digital string, or relative to the type of anomaly. For example, a sudden and severe anomaly may start with a 50% degradation from baseline, so an action which completely remediated the sudden and severe anomaly would start with a baseline score of 85. On the other hand, a creeping anomaly might only start with a 20% degradation from baseline, so an action which completely remediated the creeping anomaly would start with a baseline of only 25. As such, confidence scores can be normalized to a standard range (for example, from 1-100, with a confidence score over 50 indicating a reasonably high likelihood that the action will result in a positive network outcome). In some embodiments, a further aggregation of the score for the action across all actors may also be computed to provide an actor-independent confidence score.

Next, at decision 314, the calculated confidence score for the action being processed is compared to a threshold. For example, under the scoring framework above, the threshold may be 90, representing an extremely high confidence that the action will remediate the anomaly as well as result in expected improvement in the associated key performance indicator. In some embodiments, confidence scores are calculated for all actions first and loop 310 processes the actions in order of decreasing confidence score. If the confidence score exceeds the threshold, processing proceeds to decision 316. If the confidence score does not meet the threshold, processing instead skips to step 318.

At decision 316, it is determined whether the system can take the action automatically. In some embodiments, this is done by determining whether there is an context/actor/action tuple in the digital string matching the action being processed. In other embodiments, certain actions may be flagged as automatable. In still other embodiments, certain actions can be performed automatically by the digital network assistant in certain contexts but not in others and the context for the anomaly must be determined to make decision 316. If decision 316 determines that the action can be taken automatically, processing skips to step 320; otherwise, processing proceeds instead to step 318.

At step 318, an action which should not be taken automatically is added to an action sheet. In some embodiments, the action is added to an action sheet associated with the actor in the tuple. In other embodiments, all actions to remediate a given anomaly are assigned to the same actor. In some embodiments, the actions are added to the action sheet in order of their confidence score, such that actions most likely to remediate the anomaly are taken first. In still other embodiments, a given actor's action sheet might include actions to remediate multiple anomalies, sorted by the expected improvement in key performance indicators. Thus, the user would take first the actions most likely to improve overall network performance. Action sheets are discussed in greater detail below.

If the action can be taken automatically, processing proceeds to step 320. At step 320, the action can be taken automatically without user intervention. In some embodiments, the action is instead presented to certain select actors for confirmation before the action is automatically taken. Broadly, actions that can be taken automatically include rebooting a network element, pushing or reverting a configuration change on a network element (for example, using an automated configuration management system), activating redundant links, and any other action that does not require physical manipulation of the network element. Once each action has been processed, or once the anomaly has been remediated, loop 310 concludes.

As an example of loop 310 for a particular anomaly, consider a sudden and severe anomaly in the "call drop rate" key performance indicator. For the sake of this example, there are two actor/action tuples associated with the corresponding digital string, where "DNA" indicates that the actor is the digital network assistant: (DNA, check for/revert recent configuration changes) and (DNA, check/redress parameter compliance for associated eNodeBs). First, the confidence score for each action is determined. The digital network assistant first determines that there are no recent configuration changes, so the first action is assigned a confidence score of 0. Next, the digital network assistant checks for parameter compliance for the each eNodeB in the region associated with the anomaly. Checking the hand-off settings, the digital network assistant finds that a two-way neighbor is missing and determines that the settings are configured suboptimally. Based on historical data for this digital string, the digital network assistant assigns a confidence score of 93 to this action. Because the confidence score is above the critical threshold of 90, and because the action can be taken automatically as indicated by the actor, the digital network assistant will execute a script to implement an optimal set of parameters (i.e., adding the missing neighbor) in the network during the next available maintenance window.

Processing proceeds next to step 322, where an action effective in remediating the anomaly is identified. In some embodiments, more than one effective action can be determined for a particular anomaly. To determine the effectiveness of each action that was taken, the value of the key performance indicator or key performance indicators that are associated with the anomaly is compared before and after taking the action. The change in this value can then be used to determine the effectiveness of the action. In some embodiments, the action with the highest effectiveness is deemed to be the effective action. In other embodiments, any action with effectiveness above a given threshold is deemed to be an effective action. In still other embodiments, only the action which remediated the anomaly is deemed to be an effective action.

Finally, at step 324 the effective action is added to the digital string associated with the anomaly. In some embodiments, if the effective action is already present in the digital string, the confidence score for the action is updated. In some such embodiments, if the effective action was present in the digital string, but had not yet been observed enough to be taken automatically, the count of times the action has been observed for the anomaly is incremented.

Generating Objective Narratives

It is another function of the digital network assistant to automatically generate context-appropriate narratives for the state of the network and present them to the user. By creating these objective narratives, the digital network assistant can communicate the stories underlying the data being processed and the workflow being performed. Narratives may be template-based and/or learned based on user feedback and the information to be included. In particular, the narrative engine of the digital network assistant abstracts the most relevant key performance indicators for each user or user class and presents them in a format that can be easily comprehended by the user.

A variety of types of narrative can be created and presented to the user. For example, an operational performance narrative is a story related to the general performance of the network, tailored to the level of the recipient (as described in greater detail below). Users can apply a variety of filters to drill down into a particular aspect of the network, such as particular network elements (for example, the status of the eNodeBs in the network), the status of the network in a particular market or geographic region, particular key performance indicators the user is interested in tracking, or other network aspects. Once a user has configured their preferred narratives, they can be saved so that the user is presented with those narratives on a recurring basis.

Alternatively or in addition, narratives can be generated relating to business performance aspects of the network (i.e., the tasks and activities carried out by users in performing a particular workflow. Thus, for example, a user interested in tracking a particular anomaly can receive a narrative regarding the status of the relevant key performance indicators, the actions taken to remediate the anomaly and their effects, and so on. Similarly, scenario narratives describing the complete digital string can be generated by the narrative engine of the digital network assistant. For example, a narrative relating to a particular anomaly might describe the detection of the degraded key performance indicator, the classification of the anomaly into a particular digital string, the actions performed, the actions that proved effective, and the inferred root cause (and any intermediate causes) for the anomaly.

Still another type of narrative is the action sheet narrative, which describes the action items assigned to a particular user. For example, an engineer might prefer to receive an action sheet narrative first thing in the morning outlining his assigned tasks for the day. Relatedly, a user might receive a push notification in the form of an alert narrative, describing a network outage or other anomaly that includes the triage steps already taken and their outcomes, and recommended next steps for the user to perform.

Narratives can be further tailored by the narrative engine of the digital network assistant to be relevant to the user's role and the desired time scale. Roles can be of limited scope or broad scope. For example, roles might include engineer, project manager, market manager, and executive, while time scales might include daily, weekly and monthly narratives. For example, a daily action sheet narrative would focus on tasks to be accomplished that day, while a monthly action sheet narrative would focus on longer-term goals. Similarly, a "state of the network" narrative targeted to an engineer might focus on specific key performance indicators for the markets for which the engineer is responsible, while a "state of the network" narrative for an executive would focus on consumer-focused key performance indicators for the entire country. Alternatively, a project manager's "state of the network" might be focused on the projects for they are responsible, and include details relating to the project budget, milestones hit and missed, baseline effort, worker productivity, and so on.

Once generated, the narratives can be delivered in the user's choice of format (e.g., via email, PDF, or PowerPoint presentation) by using custom templates for each format. The narratives can also be delivered to the user on a user-configurable schedule (as in the case of the morning "state of the network" narrative described above), automatically as triggered by a network event (for example, an action sheet narrative associated with a detected anomaly) or on demand (for example, if the user is performing a one-time review of certain aspects of aspects of the network).

Visualizations and the Augmented Reality Interface

It is yet another role of the digital network assistant to generate and present to the user appropriate visualizations for key network data and action items. Such data might include time series for key performance indicators in the network or raw data streams, or visual depictions of step-by-step instructions to carry out individual action items. These visualizations can be presented conventionally via a monitor or the display of a mobile device, or via an augmented reality interface such as the Microsoft® HoloLens.

Figure 4:
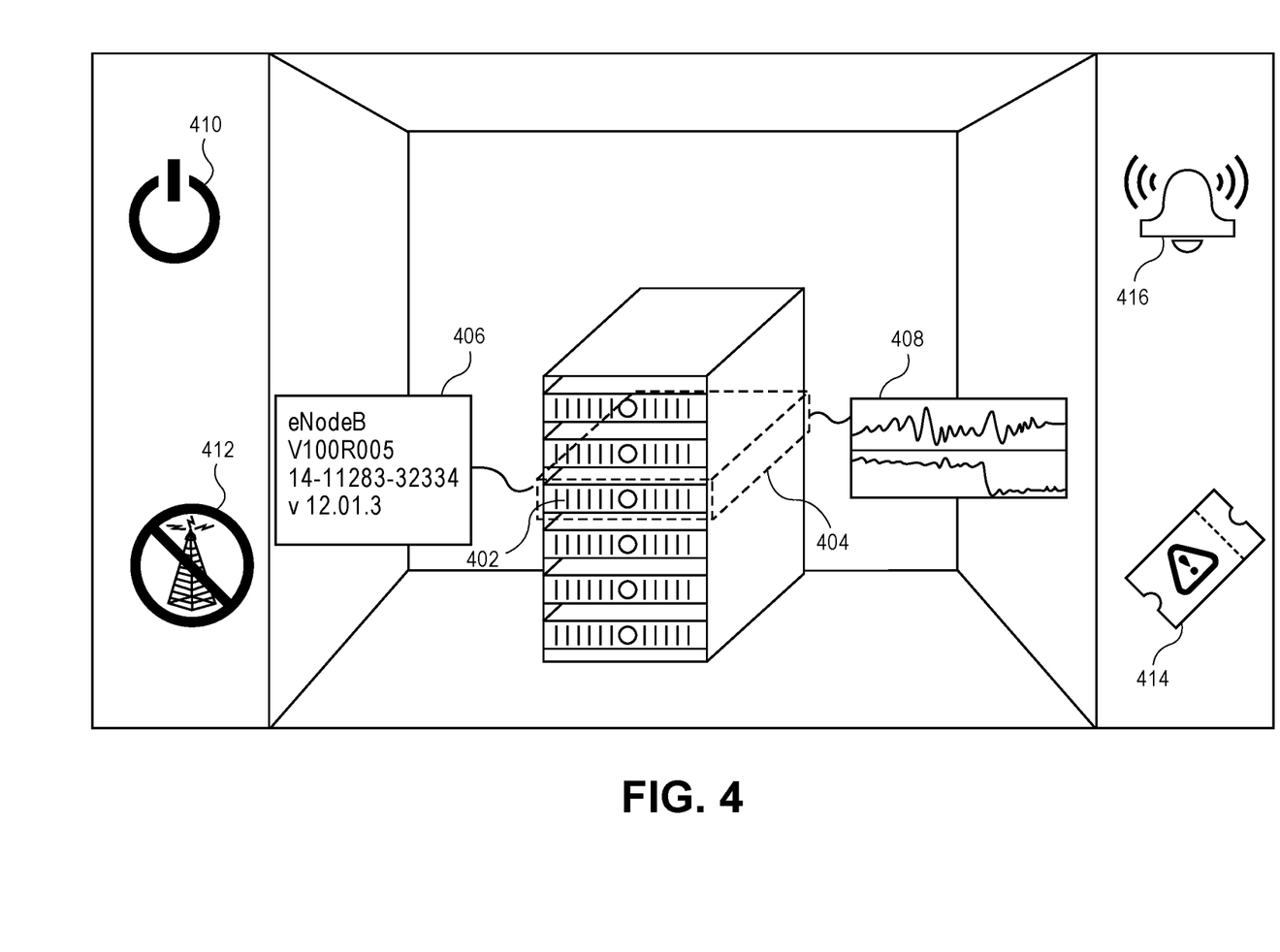
FIG. 4 depicts an augmented reality interface in accordance with embodiments of the invention.

In addition to providing a mobile, heads-up interface for the digital network assistant, the augmented reality interface can overlay real-time information related to the task at hand to the user. For example, when a user needs to access a particular network element in an equipment closet, the digital network assistant can provide a site walkthrough on the interface to allow the user to reach the equipment closet in question, then overlay a wire-line outline on the element to point it out to the user. If the user then needs to open a particular panel, and remove a particular module, an animation of the panel opening and the module being removed can be overlaid on the actual panel and module until the user has completed the task. Alternatively or in addition, physical network elements can be annotated with virtual tags describing the equipment name, model, serial number, installation details, software version, upgrade and repair history, configuration and any other relevant information. In some embodiments, the user may be able to drill down into these tags by manipulating them, so that (for example) and engineer could examine (and manipulate) a particular configuration setting for a network element by manipulating the virtual tag corresponding to the network element's configuration.

In some embodiments, the augmented reality interface can additionally include a gestural interface to allow a user to virtually manipulate the software representation of the network element as well as physically manipulate it in real space. Action icons may be provided in the user's peripheral vision corresponding to actions that can be performed on the currently selected digital object. For example, there may be action icons for "reboot," "take offline," "load previous configuration," "load new configuration," and "show log data." When the user drags the virtual representation of a network element to one of these action icons, the digital network assistant automatically performs the selected action for the network element. Of course, different action icons may be available for different network elements, and the appropriate actions can be automatically displayed when the user selects (e.g., using a gesture, gaze or voice command) a new network element. For example, when the user selects a network antenna, the icons above might be replaced by icons allowing the user to manipulate the physical tilt or azimuth of the antenna.

An exemplary augmented reality interface is depicted in FIG. 4 and shows a view that might be overlaid on a typical equipment closet being accessed by the engineer. Depicted are a physical network element 402, a virtual overlay 404 for physical network element 302, a first virtual tag 406 depicting the model, serial number and software version for physical network element 402, a second virtual tag depicting the key performance indicators associated with physical network element 402, and action icon 410 for rebooting physical network element 402, action icon 412 for taking physical network element 402 offline, action icon 414 for generating a trouble ticket for physical network element 402, and action icon 416 for displaying the alarm data associated with physical network element 402.

In some embodiments, such an augmented reality interface can be used to provide a virtualized digital network operations center. In such embodiments, the augmented reality interface can provide collaboration features (via textual messaging, voice chat, video calling, or video conferencing) between engineers and other personnel for the purposes of network management and troubleshooting. In this way, even if engineers cannot be physically located together, they can share views of the network when diagnosing or remediating network anomalies. Because the virtual digital assistant orchestrates the functionality of network elements that can be controlled via software (or otherwise remotely), engineers can make changes from the virtual digital network operations center rather than needing to be physically present where the equipment is housed. In addition to providing a 360-degree view of (and control over) the network equipment that makes up the physical, deployed network, the virtual digital network operations center can also provide the user with a variety of other relevant network views. For example, the augmented reality interface can display a digital map of the network topology, which the user can pan, zoom, and otherwise manipulate using the gestural interface. This topology can provide information appropriate to the level of detail being displayed. For example, at a nationwide zoom level, individual markets may be displayed in a color code corresponding to their general status. When the topology is zoomed in to display individual network elements, however, the status of those network elements (including logging and/or alarm data) can be displayed individually. An engineer can thus quickly trace a problem down to a failed network element by appropriately manipulating the augmented reality interface.

In addition to providing overlay information, the augmented reality interface of the digital network assistant can supplement or replace a user's desktop. For example, when the user dons the augmented reality interface, the digital network assistant can scan the user's retinas to authenticate the user, and automatically display the user's dashboard for them, as depicted below with respect to FIG. 5. The user can then switch seamlessly between the dashboard view and the augmented reality interface.

Figure 5:
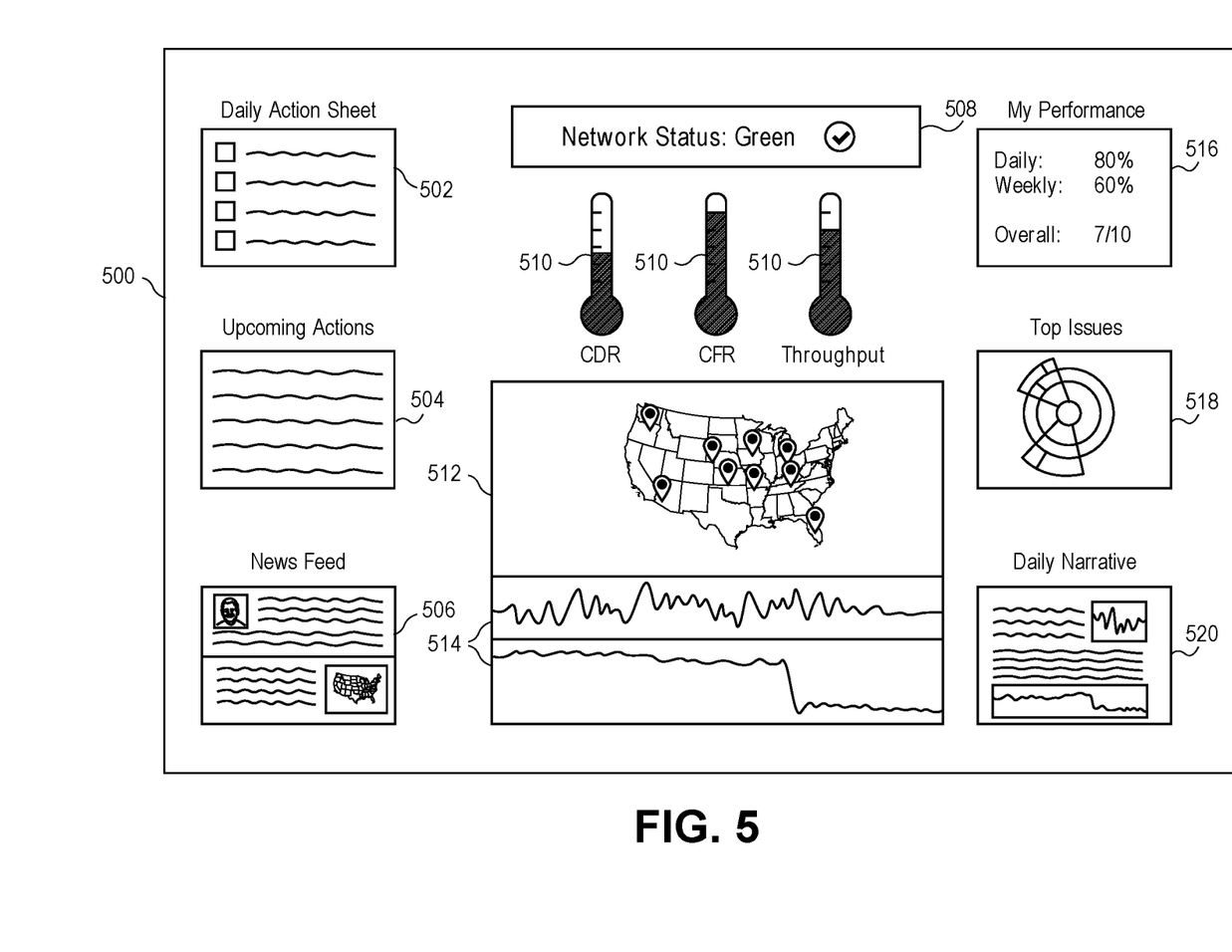
FIG. 5 depicts a dashboard interface for the digital network assistant for a user in accordance with embodiments of the invention.

Turning now to FIG. 5, a dashboard interface for the digital network assistant for a user is depicted and referred to generally by reference numeral 500. Dashboard interface 500 can be displayed on a conventional monitor or on an augmented reality interface as described above. Dashboard interface 500 collects all of the most relevant information for the user where they can view it at a glance. As depicted, dashboard interface 500 includes daily action sheet pane 502, upcoming action sheet pane 504, and news feed pane 506. These panes provide the user with a variety of views into the upcoming events that will impact the status of the network. The current status of the network can be displayed in a number of forms, such as current network status rating 508, current key performance indicator thermometers 510, and current incident map 512. Historical network data can also be depicted as in key performance indicator history 514. The user can also track their current progress with progress display 516, issue tracker 518, and personalized daily narrative 520. Of course these panes are merely one example of a personalized user configuration. Other users might have more, fewer, or different panes, or similar panes configured differently. Interfaces presented to the user may be dynamic and based on the usage context and the user's privileges. In addition, the system may be able to facilitate collaboration and orchestration across multiple context-actor-action tuples through interactive holographic and other visual representations.

Network Parameter Optimization

As described above with respect to FIG. 3, one mode of operation for the digital network assistant is the detection, analysis of the anomaly and remediation (via one or more user and/or system driven actions) of the anomaly, as evidenced by the degradation of one or more key performance indicators. Each of these steps is performed within the confines of a scenario represented by a digital string—comprising of an anomaly and one or more actor/action tuples. The primary objective in the embodiment mentioned above is to identify anomaly root cause and subsequently remedy the detected network anomaly, with each successful remediation persisted by the digital network assistant as part of a digital string library. The digital network assistant then uses this library to train itself for more accurately diagnosing future anomalies, fine-tuning correlation and causation models, and consequently increasing the confidence of future action item recommendations.

As a variation on the method depicted in FIG. 3, the digital network assistant can be used when the network is not in an anomalous state (i.e., all key performance indicators are within specification, also called a "green state" for the network) to determine optimal parameter sets for the various network elements making up the network. Conventional network management systems take a reactive approach to network troubleshooting and perform corrective actions driven by the anomalies. By contrast, the digital network assistant can act proactively to capture a network's green state. By capturing a wide variety of such network states, and the parameter sets associated with them, the digital network assistant can achieve optimal network performance for green field deployments, fine-tune markets that have similar characteristics, and compare/contrast market performance across regions that share similar characteristics. Additionally, the green-state library can be used for forward-looking purposes, such as improving network planning and design activities, simulating deployment scenarios. Finally, the green-state library can be used for audit purposes, such as minimizing the need for manual intervention during parameter audits and dramatically improving the cycle time for audit exercises.

At a high level, when the network is in a green state (i.e., all key performance indicators are within specification), the digital network assistant can vary certain parameters that are tagged to affect a particular key performance indicator to determine the optimal value for that parameter (or set of parameters) in the particular context or morphology (e.g., a dense, urban environment) for the network element. The digital network assistant may, among other things, evaluate parameter configuration of network elements when diagnosing network anomalies, so certain parameters may already be tagged as associated with the relevant key performance indicators. Thus parameter audits can be performed simply by retrieving the live network parameters and compare those to pre-built parameter audit templates. In some embodiments, out-of-specification parameters can be corrected automatically, or flagged for manual correction.

When the network remains in a stable green state over a sufficient time frame, the current parameter set can be recorded as a green-state parameter set, together with the morphological and usage characteristics of that network (including density, user base, traffic patterns, seasonality, and so forth). The time required for a parameter set to be persisted as a green-state parameter set may vary depending on the network elements and or the parameters being recorded. For example, if a software version was most recently changed, the system may wait for one week to record the current parameter set as a green-state parameter set. Alternatively, if the most recent change was replacing a particular hardware component, then a green-state parameter set may be recorded after one day. In some embodiments, green-state parameter sets may not be recorded until the network has been under load since the most recent parameter change. In some embodiments, a network engineer making (or authorizing) a parameter may determine how long the network must remain stable before the parameter set can be recorded as a green-state parameter set. The green state may also be normalized over the variables that characterize the networks (e.g., key performance indicators, morphology, traffic volume, and network element type and vendor).

Over an extended period of time (e.g., one week) and a variety of contexts for the morphology, the digital network assistant can accumulate green-state parameter sets, and the impact of changes in parameters on the associated key performance indicators. Thus a learned optimal parameter range can then be used for network tuning and green field deployments of parameter sets. These green-state parameter sets can also be represented in the augmented reality interface described above to enable play back and study of optimal network parameter configurations. The augmented reality interface may further incorporate administrative user interfaces that allow network engineers to define the morphological characteristics for a particular network.

In some embodiments, a green state parameter set may be extended to factors that influence the state beyond the network element parameter settings. One such example would be the software version of the network elements that is currently deployed and executing during the green state. Other variations of this could include details of the deployment teams (engineers, managers, technicians, etc.) that worked together to achieve the network's optimal performance. In this way, the digital network assistant can replicate the green state ecosystem in its entirety for future green state deployments. In some embodiments, green-state parameter sets may be recorded over network dimensions other than time, such as network element vendor, network element type (e.g., eNodeBs, MMEs, or IP routers), software releases, or device model. In some such embodiments, green states may be aggregated over time slices or other dimensions.

Figure 6:
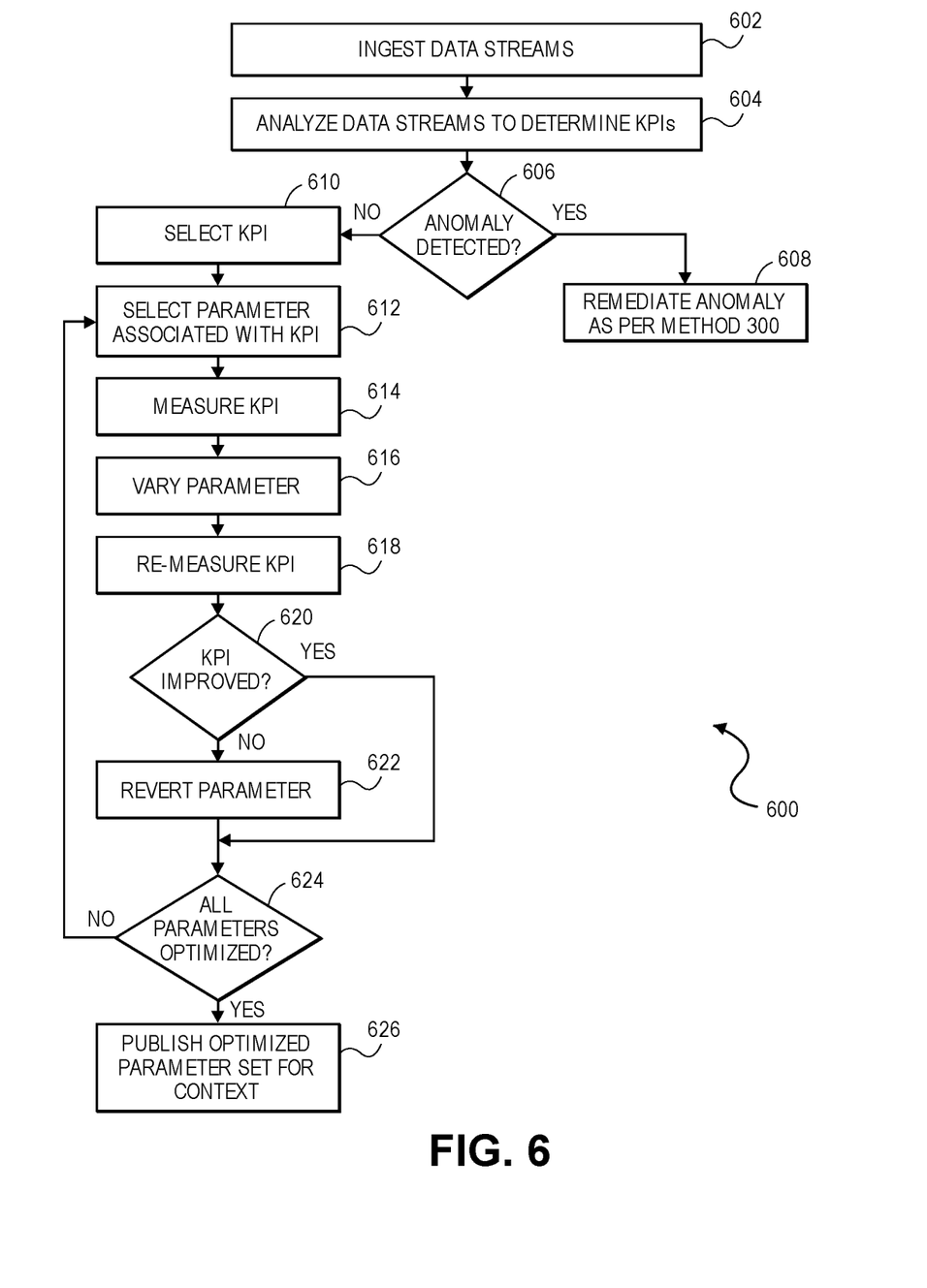
FIG. 6 depicts a flowchart showing the operation of a method in accordance with a different embodiment of the invention.

A flowchart showing the operation of a method in accordance with this variation is depicted in FIG. 6 and referred to generally by reference numeral 600, and described in additional detail below. The method begins at a step 602, where the digital network assistant ingests data streams as in step 302 of the method depicted in FIG. 3. Processing then proceeds to step 604, analogously to step 304, where key performance indicators are determined from the ingested data streams. Processing then proceeds to decision 606, where it is determined whether any network 204 is experiencing any anomalies. If so, processing proceeds to step 608, where the anomalies can be remediated in accordance with steps 308-324 of the method depicted in FIG. 3.

If no anomaly is present (i.e., if the network is in a green state), parameter optimization can begin, and processing proceeds to step 610, where a key performance indicator to optimize is selected. One of skill in the art will appreciate that there may be trade-offs between different key performance indicators in a network (e.g., improved cell utilization may result in a degraded call drop rate). As such, in some embodiments, engineers may select or prioritize key performance indicators for optimization, or mark certain parameters as fixed and not to be optimized. In other embodiments, multiple key performance indicators may be combined into a single metric for the purposes of optimization. In still other embodiments, the digital network assistant may automatically determine key performance indicators to optimize based on, for example, which of the key performance indicators for the network is closest to being out of specification.

Next, processing proceeds to step 612, where a parameter associated with the key performance indicator is selected for optimization. Parameters may be tagged as being associated with key performance indicators in a variety of ways. For example, in some embodiments, engineers may manually associate parameters with key performance indicators. In other embodiments, parameter associations with key performance indicators are stored in digital strings. In still other embodiments, associations between parameters and key performance indicators are determined when key performance indicators are impacted as a result of other changes to the parameter. In some such embodiments, network-critical parameters may be tagged as not for optimization to prevent network outages during the optimization process. In some embodiments, parameters may be selected in decreasing order of expected impact on the key performance indicator.

Once a parameter has been selected, processing proceeds to step 614 where the key performance indicator is measured to determine a baseline value from which improvement or degradation can be measured. In some embodiments, the measurement of the key performance indicator made at step 604 is used as the baseline for the key performance indicator. In other embodiments, a (possibly weighted) average of historical values for the key performance indicator is used as the baseline value. Other methods of obtaining a baseline value are also contemplated as being within the scope of the invention.

Next, at step 616, the selected parameter is varied. The precise variation in the parameter will depend on the nature of the parameter. For example, binary parameters may be toggled to vary them. In some embodiments, the parameter is varied only once; in other embodiments, a number of different values for the parameter may be evaluated. For example, discrete parameters can be iterated through each of the possible values. For continuous parameters, a binary search or hill-climbing algorithm can be used to select new values for the parameter until an optimum value is reached. In some embodiments, parameters are changed only within a small window to minimize network degradations caused by adverse parameter changes.

Once the parameter has been changed, the key performance indicator is re-measured at step 618. In some embodiments, the digital network assistant allows for a delay to allow the effects of the modified parameter to propagate through the network before re-measuring the key performance indicator. In those embodiments where the parameters are varied multiple times, the parameters may be re-measured for each variation to determine the optimum value. In other embodiments, where multiple parameters are associated with the key performance indicator, a multidimensional optimization algorithm may be used to vary all of the parameters before re-measuring the key performance indicator to determine the overall effects of the change.

Next, at step 620, the effect of the parameter change (or set of parameter changes) on the network with respect to the selected key performance indicator is determined. If the net effects of the changes made at step 616 result in an improvement in the key performance indicator, processing skips to decision 624. If the net result is a performance degradation, processing instead proceeds to step 622. At step 622, the parameter changes made at step 616 are reverted to remediate the degraded key performance indicator. In some embodiments, the optimization process for the selected parameter may restart if performance is degraded, with parameters varied differently at step 616. Once the key performance indicator is in a non-degraded state, processing proceeds to decision 624.

At decision 624, it is determined whether all parameters associated with the key performance indicator have been optimized. If parameters remain to be optimized, processing returns to step 612. If all parameters have been optimized, processing proceeds to step 626. There, the optimized set of parameters is published by the digital network assistant for potential reuse in other contexts. Of course, an optimal set of parameters for one context may not be optimal for another context. In some embodiments, the optimal parameter sets for a given context may be tested by another, similar context when optimizing parameters. In some such embodiments, the optimal parameter set for a similar context is used as the base parameter set for optimization by those regions.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A system for managing a complex network, comprising:
 a network element of the complex network, wherein a parameter controls at least one aspect of operation of the network element;
 a digital network assistant, programmed to automatically optimize the parameter by:
  ingesting a data stream from the network element;
  measuring, based at least in part on the data stream, a key performance indicator for the complex network;
  determining, based at least in part on the key performance indicator, that no anomaly is present in the complex network;
  determining that the parameter is associated with the key performance indicator;
  determining a baseline value for the key performance indicator;
  determining a new value for the parameter;
  changing the parameter on the network element to the new value;
  determining an updated value for the key performance indicator resulting from at least the new value for the parameter on the network element; and
  based on a comparison of the updated value for the key performance indicator and the baseline value for the key performance indicator, reverting the parameter change on the network element.

2. The system of claim 1, further comprising an additional network element, and wherein the digital network assistant is further programmed to publish the optimized parameter for use on the additional network element.

3. The system of claim 1, wherein digital network assistant is further configured to optimize an additional parameter, by:
 determining a second new value for the additional parameter;
 changing the second parameter on the network element to the second new value; and
 based on a comparison of the updated value for the key performance indicator and the baseline value for the key performance indicator, reverting the second parameter change on the network element.

4. The system of claim 1, wherein the digital network assistant is further programmed to optimize the parameter by:
 determining a revised new value for the parameter, wherein the revised new value is different from the revised new value and an original value for the parameter;
 changing the parameter on the network element to the revised new value; and
 determining a revised updated value for the key performance indicator resulting from at least the revised new value for the parameter.

5. The system of claim 1, wherein the digital network assistant is further programmed to optimize the parameter by:
 determining a second baseline value for a second key performance indicator before changing the parameter on the network element;
 determining a second updated value for the second key performance indicator after changing the parameter on the network element; and
 based on a comparison of the second updated value for the key performance indicator and the second baseline value for the key performance indicator, reverting the parameter change on the network element.

6. The system of claim 5, wherein the digital network assistant is further programmed to tag the parameter as associated with the second key performance indicator if the second updated value is different from the second baseline value.

7. The system of claim 1,
wherein the system includes a plurality of network elements related to the network element,
wherein the digital network assistant is further programmed to change the parameter to the new value on the plurality of related network elements when changing the parameter on the network element to the new value, and
wherein the digital network assistant is further programmed to revert the parameter change on the plurality of related network elements when reverting the parameter change on the network element.

8. The system of claim 1, wherein the parameter is a software version for the network element.

9. The system of claim 1, wherein the step of determining that no anomaly is present in the complex network is based on a plurality of key performance indicators for the complex network.

10. The system of claim 1, wherein the complex network is a telecommunications network and the network element is an eNodeB.

11. A method of optimizing network parameters in a complex network, comprising the steps of:
ingesting a plurality of data streams from a respective plurality of network elements;
analyzing the data streams to determine a key performance indicator;
determining, based at least in part on the key performance indicator, that no anomaly is present in the complex network;
selecting a parameter associated with the key performance indicator for optimization;
determining a baseline value for the key performance indicator;
determining a new value for the parameter;
changing the parameter on a network element of the plurality of network elements to the new value;
determining an updated value for the key performance indicator resulting from at least the new value for the parameter; and
based on a comparison of the updated value for the key performance indicator and the baseline value for the key performance indicator, reverting the parameter change on the network element.

12. The method of claim 11, wherein the network element is a first network element, and further comprising the steps of:
changing the network parameter on a second network element; and
based on a comparison of the updated value for the key performance indicator and the baseline value for the key performance indicator, reverting the parameter change on the second network element.

13. The method of claim 11, wherein the parameter is a first parameter, the new value is a first new value, and further comprising the steps of:
determining a second new value for a second parameter;
changing the second parameter on the network element to the second new value; and
based on a comparison of the updated value for the key performance indicator and the baseline value for the key performance indicator, reverting the second parameter change on the network element.

14. The method of claim 11, where the step of reverting the parameter change further includes the steps of:
determining a revised new value for the parameter, wherein the revised new value is different form the revised new value and an original value for the parameter;
changing the parameter on the network element to the revised new value; and
determining a revised updated value for the key performance indicator resulting from at least the revised new value for the parameter.

15. The method of claim 11, further comprising the steps of:
determining a second baseline value for a second key performance indicator before changing the parameter on the network element;
determining a second updated value for the second key performance indicator after changing the parameter on the network element;
determining that the second updated value is different from the second baseline value; and
tagging the parameter as being associated with the second key performance indicator.

16. The method of claim 11, further comprising the step of publishing the optimized parameter for use on at least one additional element of the plurality of network elements.

17. The method of claim 11, further comprising the steps of:
monitoring the stability of the complex network for a predetermined period of time after changing the parameter on the network element; and
if no additional anomaly in the complex network is detected during the predetermined period of time, recording a current parameter set for the network as a green-state parameter set.

18. A method of managing a complex network, comprising the steps of:
ingesting a plurality of data streams from a respective plurality of network elements;
based on the plurality of data streams, determining whether an anomaly exists in the network;
if an anomaly exists in the network:
identifying a digital string associated with the anomaly and including a plurality of actions likely to remediate the anomaly;
for each action of the plurality of actions:
determining if the action can be performed automatically;
calculating a confidence score for the action;
if the calculated confidence score is above a predetermined threshold and the action can be performed automatically, automatically performing the action; and
otherwise, adding the action to an action sheet for the anomaly;
determining an effective action for the anomaly, wherein the effective action remediates the anomaly; and
storing the effective action as an action likely to resolve the anomaly; and
if an anomaly does not exist in the network:

measuring, based on the plurality of data streams, a baseline value for a key performance indicator for the complex network;

determining that a parameter for a network element of the plurality of network elements is associated with the key performance indicator;

determining a new value for the parameter;

changing the parameter on the network element to the new value;

determining an updated value for the key performance indicator resulting from at least the new value for the parameter on the network element; and based on a comparison of the updated value for the key performance indicator and the baseline value for the key performance indicator, reverting the parameter change on the network element.

19. The method of claim 18, wherein the complex network is a telecommunications network and the key performance indicator is a call drop rate.

20. The method of claim 18, wherein the complex network is a cable network and the anomaly is a sudden and severe anomaly.

\* \* \* \* \*